United States Patent
Cabillic et al.

(10) Patent No.: US 9,392,051 B2
(45) Date of Patent: Jul. 12, 2016

(54) APPLICATION DISTRIBUTION SUPPLYING A DEDICATED APPLICATION TO A TERMINAL FROM AN APPLICATION DEPOSITED BY THE DEVELOPER

(75) Inventors: Gilbert Cabillic, Brece (FR); Jean-Philippe Lesot, Argentre du Plessis (FR)

(73) Assignee: Google Inc., Mountain View, CA (US)

( * ) Notice: Subject to any disclaimer, the term of this patent is extended or adjusted under 35 U.S.C. 154(b) by 354 days.

(21) Appl. No.: 13/992,120

(22) PCT Filed: Dec. 6, 2011

(86) PCT No.: PCT/EP2011/071979
§ 371 (c)(1),
(2), (4) Date: Nov. 25, 2013

(87) PCT Pub. No.: WO2012/076554
PCT Pub. Date: Jun. 14, 2012

(65) Prior Publication Data
US 2014/0108600 A1    Apr. 17, 2014

(30) Foreign Application Priority Data
Dec. 6, 2010 (FR) .................... 10 60150

(51) Int. Cl.
| | | |
|---|---|---|
| G06F 15/16 | (2006.01) | |
| H04L 29/08 | (2006.01) | |
| G06F 9/44 | (2006.01) | |
| G06F 9/445 | (2006.01) | |

(52) U.S. Cl.
CPC H04L 67/10 (2013.01); G06F 8/64 (2013.01); G06F 8/71 (2013.01); G06F 9/44536 (2013.01); G06F 9/44542 (2013.01)

(58) Field of Classification Search
CPC ...... G06F 9/44536; G06F 21/572; H04L 9/32
See application file for complete search history.

(56) References Cited

U.S. PATENT DOCUMENTS

| | | | | |
|---|---|---|---|---|
| 8,396,764 | B1 * | 3/2013 | Macaluso | G06F 8/63 455/557 |
| 8,667,483 | B2 * | 3/2014 | Coussemaeker | G06F 8/61 717/174 |
| 9,098,309 | B2 * | 8/2015 | Vick | G06F 8/4432 |
| 2005/0091349 | A1 | 4/2005 | Scheibli | |
| 2006/0143601 | A1 * | 6/2006 | Concha | G06F 8/61 717/170 |
| 2009/0158270 | A1 | 6/2009 | Funk et al. | |
| 2010/0235430 | A1 * | 9/2010 | Kim | H04M 1/72522 709/203 |

(Continued)

OTHER PUBLICATIONS

International Search Report prepared by the European Patent Office in International Application No. PCT/EP0211/071979, completed Mar. 15, 2012.

*Primary Examiner* — Umar Cheema
*Assistant Examiner* — Tesfu Mekonen
(74) *Attorney, Agent, or Firm* — McDonnell Boehnen Hulbert & Berghoff LLP

(57) ABSTRACT

A method for providing an online distribution service with an application dedicated to a terminal type. The method includes: identifying a terminal type associated with a terminal connected to the online distribution service, supplying a terminal type identifier; obtaining at least one characteristic of the terminal according to the terminal type; compiling the dedicated application from a generic application according to the at least one terminal type characteristic; and transmitting the dedicated application to the connected terminal.

17 Claims, 2 Drawing Sheets

(56) References Cited

U.S. PATENT DOCUMENTS

Figure 1:
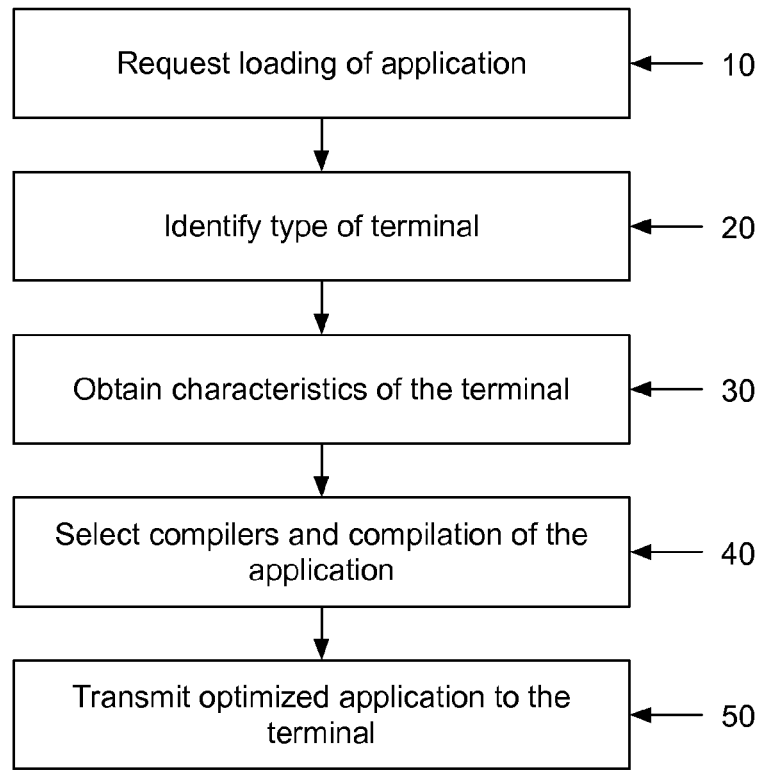

2010/0281475 A1\* 11/2010 Jain .................... G06F 8/68
717/172

2011/0083069 A1\* 4/2011 Paul ..................... G06F 8/60
715/234

2011/0258301 A1\* 10/2011 McCormick ........... H04L 67/34
709/222

\* cited by examiner

APPLICATION DISTRIBUTION SUPPLYING A DEDICATED APPLICATION TO A TERMINAL FROM AN APPLICATION DEPOSITED BY THE DEVELOPER

CROSS-REFERENCE TO RELATED APPLICATIONS

This Application is a Section 371 National Stage Application of International Application No. PCT/EP2011/071979, filed Dec. 6, 2011, which is incorporated by reference in its entirety and published as WO 2012/076554 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The invention pertains to the field of the distribution of applications. The invention pertains more particularly to a novel means and to a novel method for distributing applications.

PRIOR-ART SOLUTIONS

Online services for distributing applications have appeared recently. These services enable a user of mobile telephones, tablets, television, etc to download applications on to his device. More generally, online distribution services for making applications available to terminals through a network are becoming more widespread.

The downloading is sometimes free of charge and sometimes has to be paid for so as to remunerate the online distribution service and/or pay fees for using the application. These fees are then repaid in part or totally to the applications developer who has filed his application with the online distribution service. The developer therefore herein has a key role in these online distribution services because it is he who provides the applications to be distributed on the online distribution service.

For his part, the developer must first of all develop his application for the terminal for which he wishes to propose his application (a terminal may be a computer, a telephone, a programmable personal digital assistant, etc).

Thus, the developer will first of all choose the terminals for which he will develop applications and then use one or more development environments enabling development for these terminals and enabling the generation of an application code executable on the chosen terminals.

There are development environments producing binary code that is directly executable by the processor of the terminal. In this case, the terminal preliminarily has application programming interfaces (APIs) used to develop the application and in this case the developer must carry/optimize his application for each terminal having a different processor and a different API.

As examples, we can cite the Windows or Linux systems which can be executed on different processors with different peripherals. The designer of an application develops it so that it uses compatible libraries, the application being then compiled in binary code through the development environment. Since the binary code is dependent on each processor, it is necessary to develop one binary code per type of processor.

For its part, although based on binary code, the iPhone OS (iOS™) is also used to mask different platforms of iOS terminals in being based on a version of iPhone™ OS (iPhone 2G, 3G, 3GS, 4, iPad™). The iPhone OS implements the "universal binary" technique which is none other than a simple binary code containing several versions of the binary code as a function of the target processor.

Other development environments generate an intermediate code executable through a runtime environment (execution environment of the virtual machine) comprising a set of libraries and a virtual machine. In this case, these development environments make it possible to target all the terminals compatible with this runtime environment. It must be noted that a virtual machine of this type can either comprise an interpreter which emulates the intermediate code instructions on the machine or enable an AOT ("ahead of time") compilation of intermediate code into binary code before executing it. It can be noted that other compilation techniques can be used to carry out the dynamic compilation of intermediate code into binary code such as JIT ("just-in-time") compilation or DAC (dynamic adaptive compilation), but these techniques are used on the terminal and must take account of the constraints of the terminal. Hence, they do not make it possible to obtain a level of optimization equivalent to what can be provided by an offline development environment generating terminal-dependent optimized binary code.

In addition to this specific feature pertaining to development environments, the terminals also offer different levels of mutual compatibility of executable code. Thus, there are terminals using a runtime environment that supports binary application code and other runtime environments using a virtual machine capable of executing intermediate code. It can also be noted that application programming interfaces (APIs) are not necessarily available between different environments. For example, an application developed for iPhone cannot be executed on Android™.

With respect to an approach with a runtime environment, this makes it possible to totally or partially abstract the specific parts of the terminal and makes it simpler to execute an application on a set of different terminals. The shortcoming of this approach which maximizes developments for a developer is that it does not make it possible to have a totally optimized code for each terminal.

For example, the runtime environment of the Android system gives preference to the development of applications in the Java object language and offers a set of programming interfaces (APIs). There are several versions of APIs. The development environment will compile the Java code of the application into dex (Dalvik executable) code which is executable through the Dalvik™ virtual machine integrated into the Android runtime environment.

One way to distribute the application is for the developer to file his application in an application distribution system. This distribution system enables the terminal user, by means of a web interface or an application embedded in the terminal, to choose to select the applications to be loaded into the terminal. Once loaded, the application will be installed on the terminal and can be executed by the user.

In the Android context, the application developer files his application comprising a dex code on the online distribution service namely "Android Market™". One of the advantages of the dex code is that it can be loaded and then executed on all the terminals that comprise a certain Android version, whatever the processor.

The use of a runtime environment based on virtual machines thus makes it possible to abstract a set of terminal platforms, but this use does not make it possible at all times to obtain a highly optimized application for a given platform (indeed, during their generation, the runtime environment is planned to be independent of the processor of the terminal).

Thus, the optimizing of the application can really be done only on the terminal. As indicated here above, present-day virtual machines contain AOT, JIT or DAC compilers known to those skilled in the art. These compilers themselves consume processing time and energy. Despite the resources that they use, this compromise that has to be achieved does not enable optimizations in an applications code equivalent to those of the offline compilers.

SUMMARY OF THE INVENTION

An aspect of the invention pertains to a method for making an application dedicated to a type of terminal available to an online distribution service from a generic application code.

According to the invention, such a method comprises:
- a step for identifying a type of terminal connected to said distribution service;
- a step for obtaining at least one characteristic of said terminal;
- a step for compiling said dedicated application from a generic application as a function of said at least one characteristic of said terminal delivering a dedicated application;
- a step for transmitting said dedicated application to said terminal.

According to a preferred implementation, the different steps of the method according to the invention are implemented by a software program or computer program, this software program comprising software instructions that are to be executed by a data processor of a relay module according to the invention and being designed to command the execution of the different steps of this method.

Consequently, the invention also pertains to a program capable of being executed by a computer or by a data processor, this program comprising instructions to command the execution of the steps of a method as mentioned here above.

This program can use any programming language whatsoever, and be in the form of source code, object code or intermediate code between source code and object code such as in a partially compiled form or in any other desirable form.

The invention also seeks to obtain an information carrier readable by a data processor and comprising instructions of a program as mentioned here above.

The information carrier can be any entity or device capable of storing a program. For example, the carrier may comprise a storage means such as a ROM, for example a CD ROM or a microelectronic circuit ROM or again a magnetic recording means, for example a floppy disk or a hard disk drive.

Besides, the information carrier can be a transmissible carrier such as an electrical or optical signal that can be conveyed through an electrical or optical cable, by radio or by other means. The program according to the invention can especially be downloaded on an Internet type network.

As an alternative, the information carrier can be an integrated circuit in which the program is incorporated, the circuit being adapted to execute the method in question or to be used in the execution of the method in question.

According to one embodiment, the invention is implemented by means of software and/or hardware components. From this point of view, the term "module" may correspond in this document equally well to a software component and to a hardware component or to a set of hardware and software components.

A software component corresponds to one or more computer programs, one or more sub-programs of a program or more generally to any element of a program or a software program capable of implementing a function or a set of functions according to what is described here below for the module concerned. A software component of this kind is executed by a data processor of a physical entity (a terminal, a server, etc) and is capable of accessing the hardware resources of this physical entity (memories, recording media, communications buses, electronic input/output boards, user interfaces, etc).

In the same way, a hardware component corresponds to any element of a hardware unit capable of implementing a function or a set of functions according to what is described here below for the module concerned. It may be a programmable hardware component or a component with integrated processor for the execution of software, for example an integrated circuit, a smartcard, a memory card, an electronic board for executing firmware, etc.

LIST OF FIGURES

Figure 4:
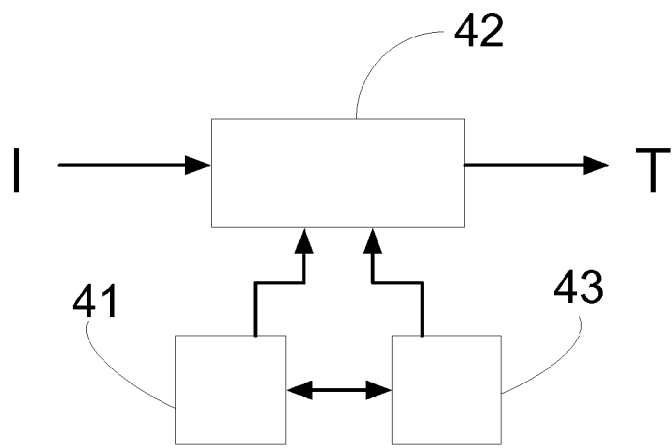
Figure 2:
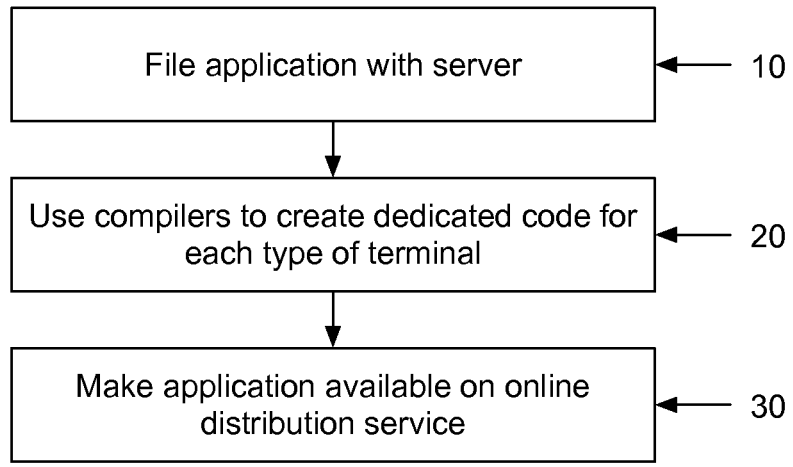
Figure 3:
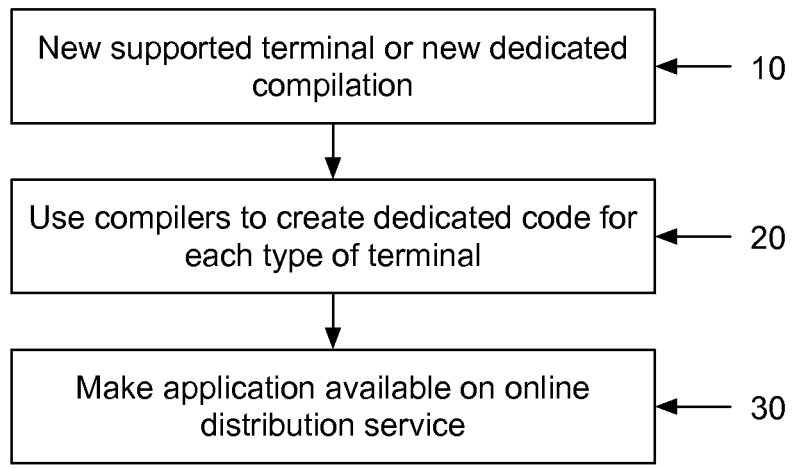

Other features and advantages of the invention shall appear more clearly from the following description of a preferred embodiment, given by way of a simple illustrative and non-exhaustive example and from the appended drawings, of which:

FIG. 1 describes the general principle of the invention;

FIG. 2 describes the process of compiling an application shortly after this application has been filed on the online distribution service;

FIG. 3 describes the process of compiling an application during the addition of a novel type of supported terminal;

FIG. 4 describes a device for making available according to the invention.

DETAILED DESCRIPTION OF THE INVENTION

1. Reminder of the Principle of the Invention

The method described here below does not have the problems of the prior art. It achieves this by making it possible to automate the generation of several dedicated applications codes from only one original application code for a dedicated terminal as well as by enabling developers to distribute their applications to previously non-supported terminals, or again by making it possible to automatically generate an applications code for terminals that have changed their specifications (hardware and/or software specifications).

The basis of the method relies on one or more compilers capable of generating a dedicated code for a platform of a given terminal from an applications code which will be made available by the developer on the server.

The input code of the compiler can be in different forms: source code or intermediate code. The compiler compiles this code into a new dedicated code on a platform of a given terminal. The code generated can be in the form of binary code or intermediate code or a mixture of binary/intermediate code.

These different compilers make it possible to dedicate the applications code differently according to the user's target terminal and the goal to be attained. Each compiler has a series of particular optimizations or possibilities of generation that can be used on the input code depending on the target terminal.

In certain cases of implementation, the compiler has optimizations for generating a dedicated code aimed at better performance (in terms of execution time, memory access or energy consumption). The code generated may be in binary form or intermediate form depending on the capacities of the compiler. The optimizations may be of several orders:

- Optimization targeting a particular processor. Such optimization enables the insertion of specific instructions of the processor. Other optimizations enable the management of a stream of instructions proper to the pipeline of the processor and rationalize dependencies between instructions, making it possible to limit cases of stalling that block the pipeline of the processor.
- Optimization targeting the memory hierarchy of the processor. Such optimization aims at optimizing access to the caches of the different memory levels up to the main memory or the peripheral memory. They make it possible to restrict the number of access data elements or code elements or to group them together to obtain better location. This therefore reduces the number of "stalls" introduced into the pipeline of the processor because of the latency needed to repatriate the data. Grouping the data together will also restrict these memory access operations.
- Optimizations on the peripherals of the platforms such as the use of specific features of certain peripherals enabling the platform to be optimized. For example, floating point, 2D or 3D GPU, Network, etc.
- Optimization of the intermediate code which is to be executed on a virtual machine. This optimization provides especially the ability to produce a combined code comprising an optimized binary code and intermediate code. This optimization enables major optimization of the intermediate codes of environments based on virtual machines such as Android.
- Optimization enabling the generation of code giving preference to instructions with low energy consumption.
- Any other optimization of the prior art that can be used and makes it possible to optimize an execution platform, etc.

In certain implementations, the compiler can also have available different optimizations to reduce the size of the code of the application. Indeed, since the applications have to be transmitted from the server to the target terminal through a network that can be a wireless network, reducing the size of the code to be sent to the terminal reduces the time for loading applications by the user. Besides, in the case of an intermediate code to be compiled into binary mode on the terminal, the fact of having reduced the size of the code to be sent on the terminal drastically reduces the time taken to compile this intermediate code into binary code on the target terminal.

Furthermore, when the application is in source format or intermediate code format, it is possible to convert it into binary code or another intermediate code or another source code. Because of this possibility of dedicated conversion, one particular implementation of the invention makes it possible to reach a terminal that is initially not supported, and to do so transparently for the developer.

As for the online distribution service, it relies on an architecture that enables:
1. Application codes to be stored on storage peripherals.
2. Developers to file applications in format executable by the terminal on the server and manage the different versions of these filing operations.
3. A user of the terminal to purchase and/or download an application for his terminal.

FIG. 1 describes the principle of operation of the invention. A terminal of a user links up to the online distribution service to obtain an application.

The first step (20, FIG. 1) consists in identifying the type of terminal of the user (an identifier) during a preliminary request for downloading an application (10, FIG. 1). This enables the online distribution service to dynamically select the different compilers as well as the optimizations to be applied in order to optimize the code of the application for this terminal. The terminal can especially indicate its type during the connection to the distribution server or by any other means.

Once the type of terminal has been identified, the second step (30, FIG. 1) consists in loading the profile containing the characteristics to the terminal. This profile describes for example the processor used, the memory hierarchy, the available peripherals and co-processors. It can also describe the version of the APIs supported, the binary or intermediate code supported as well as their version or any other piece of information making it possible to choose the compilation to be applied in order to dedicate the code for this terminal.

In one particular implementation, these pieces of information can be stored in the online distribution service. A database makes it possible, through the identifier of the type of terminal, to retrieve the profile containing the characteristics of this terminal. In another implementation, the profile can be transmitted directly by the terminal to the distribution server through the request for loading the application or upon a request from the distribution server.

In another implementation, it is also possible to associate one compiler per type of device and to embed this profile directly in the compiler. A manufacturer of a device can thus file the profile and/or the compiler on the online distribution service in order to manage the optimization of the applications for his terminals as efficiently as possible.

In the third step (40, FIG. 1), the distribution server will activate the different compilers with their associated configuration in order to obtain the dedicated applications code to be transmitted to the terminal (50, FIG. 1). The time at which this compilation is done can vary according to the architectures of the online distribution services.

In one particular implementation, the compilation can be done when a user of the online distribution service requests a download. Thus, when the user asks for the downloading of an application, the compiler enabling the compilation of the application for the user's telephone is used to obtain the binary code of the application that is downloaded by the user. This principle nevertheless impacts on the latency needed for the user to load the application, the compilation being done at request. A cache can be set up to limit this latency. All the cache eviction techniques can then manage the size of this cache according to the characteristics of the online distribution service and the quality of service that it must deliver.

In one particular implementation (FIG. 2), the compilation can be done during the filing of the application by the developer on the server (10, FIG. 2). In this case, the online distribution service uses one or more compilers to compile the filed code and create a dedicated version for each type of terminal (20, FIG. 2).

Once optimized, the application is made available on the online distribution service (30, FIG. 2). This principle has an impact on the point in time when the application is made available to the users of the online distribution service because it is necessary to wait for the different versions to be generated in order to make the application available to the users. Nevertheless, this principle can be used to eliminate the compilation times of the application on request.

The compilation can also be done when the filing is made in parallel with the standard operation of the online distribution service. Thus, rather than generate different versions during the depositing, the online distribution service anticipates the compilation of the application during normal operation of the online distribution service. If the application requested by a user is already ready, it can thus transmit it directly without having to compile it. If not (the application is not ready), the application is compiled at request and stored in the online distribution service.

In another particular implementation (FIG. 3), the dedicated compilations can be done by the server for each of the generic applications once a new terminal is supported or once a new dedicated compilation is selected for a given terminal. Thus, once a new terminal is supported or a new dedicated compilation is set up for a given terminal (10; FIG. 3), the compilers are used to generate the code dedicated to this terminal from the code of the generic application (20; FIG. 3). These codes are stored on the server. Once a dedicated code is ready, it is made available to the users on the online distribution service (30; FIG. 3).

Naturally, these different approaches can be combined with one another in order to take account of the specific features of the architectures of the online distribution service, their cost, their means (number of servers, disk quota, etc) or the level of quality of service for the users (longer or shorter waiting times for obtaining the dedicated code). Thus, although these methods are the basic principles of the online distribution service, they can be adapted or can be subjected to variations.

FIG. 4 is a simplified view of an example of a structure of a device for making available according to one embodiment of the invention.

For example, the device for making available comprises a memory 41 constituted by a buffer memory, a processing unit 42, equipped for example with a microprocessor and a random-access memory, and driven by the computer program 42, implementing a program for making available according to the invention.

At initialization, the computer program code instructions 43 are for example loaded into a memory and then executed by the processor of the processing unit 42. The microprocessor, the random-access memory, the computer program work together and form the means for making available according to the method of the invention in this embodiment. In other embodiments, specific hardware processing modules can be implemented to apply the invention.

1.1 Description of One Particular Embodiment

By way of an example, a description is given here below of a particular implementation of the method integrated into the "Android Market" online distribution service.

As indicated here above, in the Android Market context, the applications developer files his application comprising a dex code on Android Market. The advantage of this dex code is that it can be loaded and then executed on all Android terminals having a Dalvik virtual machine. Android Market stores all the applications and makes them visible to the users of Android Market through a "market" application integrated with the Android terminal.

When a user so wishes, he can choose an application using the market application and ask for it to be downloaded on his terminal. Once downloaded, the application is installed by the Android system and the user can execute it.

In the Android Market context, the type of terminal can be an identifier. Through this identifier, the characteristics of the terminal are known and comprise for example the version of the Android system that is being executed in the terminal (for example: Gingerbread 2.3, Eclair 2.1, Honeycomb 3, etc), as well as the name of the vendor product, and the type of hardware platform (for example ARM or X86). Other pieces of information proper to each terminal can be included therein.

Then, through these characteristics, the Android Market, in this embodiment, can organize the application in different ways through the use of different compilers.

In one particular implementation, a dex code optimizer making it possible to obtain a dedicated dex code is used in order to dedicate the dex code of the application for a particular terminal. This dedicated code is transmitted to the target terminal (the one making the request for downloading).

In another implementation, a binary code dedicated to a terminal is generated from the dex code and transferred to the target terminal in order to benefit from all the possible optimizations that can be made on the server. For example, the binary code can be produced by means of a dex-to-binary code compiler.

In another implementation, the target terminal supports the execution of an intermediate code known as an LLVM (low level virtual machine) bytecode. LLVM is a compiler infrastructure designed to optimize compilation, link editing, execution and idle time in a program written in any unspecified language.

The LLVM compilation tools comprise especially a set of compilation tools based on an intermediate code called a "bytecode". LLVM comprises especially an optimizer capable, in an optimized manner, of converting a bytecode into an optimized, bytecode independent of the processor. This optimizer has a very great number of options of optimization. LLVM also has several binary code generators. These generators can be executed either on the terminal or on a server or on a development machine. LLVM has the advantage of having available a large number of generators for different types of processors, as well as a large number of optimizations that can be used independently of the target processor.

In another particular implementation, the LLVM bytecode can also be dedicated, on the server, at different levels depending on the characteristics of the terminal.

In one particular implementation, the LLVM bytecode optimizer is used to compress the code of the application to be transferred to the requesting terminal. In another implementation, the bytecode optimizer is used to generate a code taking account of the particular characteristics of the terminal. The code generated thus becomes dependent for example on the internal programming interfaces of the applications.

In another implementation, the LLVM bytecode optimizer is used to generate a bytecode that takes account of the particular characteristics of the terminal and is also compressed. The generated code thus becomes dependent for example on the programming interfaces of the applications and is compressed in order to limit the size of the application to be transferred.

In another implementation, in the particular case of an Android and if this Android has to support the execution of a bytecode, the compilation of dex code into bytecode offers a way of reaching the terminals that do not support dex code.

In another implementation, a combination of compilers can be made. In the preceding case, it is possible to use the LLVM bytecode optimizer as well as the LLVM binary generator to dedicate the application to the terminal.

Although the present disclosure has been described with reference to one or more examples, workers skilled in the art will recognize that changes may be made in form and detail without departing from the scope of the disclosure and/or the appended claims.

The invention claimed is:

1. A method for making an application, dedicated to a type of terminal, available to an online distribution service, wherein the method comprises:
   identifying a type of terminal, associated with a terminal connected to said online distribution service, delivering an identifier of type of terminal;
   obtaining at least one characteristic of said terminal as a function of said type of terminal, said at least one characteristic including one or more of a version of supported APIs and a version of supported binary code or supported intermediary code;
   compiling said application from a generic application as a function of said at least one characteristic of said type of terminal, said compiling comprising:
      selecting, from a plurality of compilers, at least one compiler associated with said type of terminal;
      selecting, based on said at least one characteristic of said terminal, at least one optimization to be applied to said application, said at least one optimization comprising an intermediate code optimization to make said optimization compatible with supported APIs and compressed to limit a size of said application;
      compiling said application using said at least one selected compiler, said at least one selected optimization, and said generic application, wherein said generic application has a source programming language, and wherein the at least one optimization comprises converting the source programming language of said generic application into a binary programming language, intermediate programming language, or another source programming language to reach a terminal that is initially not supported by said online distribution service; and
   transmitting said compiled application to said terminal,
   wherein said obtaining a characteristic of a terminal and said compiling said application as a function of said at least one characteristic are carried out when a filing of said generic application is made in parallel with a standard operation of said online distribution service.

2. The method according to claim 1, wherein said obtaining at least one characteristic of said terminal comprises:
   obtaining a compilation profile associated with said type of terminal; and
   selecting, from said compilation profile, said at least one characteristic of said terminal.

3. The method according to claim 2, wherein said obtaining a compilation profile associated with said type of terminal comprises:
   searching, within a profile data base, for a compilation profile associated with said identifier of type of terminal;
   when said searching delivers an existing profile, supplying said compilation profile associated with said type of terminal; and
   when said searching does not deliver a profile, supplying a default optimization profile.

4. A device for making an application, dedicated to a type of terminal, available to an online distribution service, wherein the device comprises:
   a non-transitory computer-readable storage device including a computer program product stored thereon; and
   a data processor to execute program code instructions of the computer program product to perform the following functions:
      identifying a type of terminal, associated with a terminal connected to said online distribution service, delivering an identifier of type of terminal;
      obtaining at least one characteristic of said terminal as a function of said type of terminal, said at least one characteristic including one or more of a version of supported APIs and a version of supported binary code or supported intermediary code;
      compiling said application from a generic application as a function of said at least one characteristic of said type of terminal, said compiling comprising:
         selecting, from a plurality of compilers, at least one compiler associated with said type of terminal;
         selecting, based on said at least one characteristic of said terminal, at least one optimization to be applied to said application, said at least one optimization comprising an intermediate code optimization to make said optimization compatible with supported APIs and compressed to limit a size of said application;
         compiling said application using said at least one selected compiler, said at least one selected optimization, and said generic application, wherein said generic application has a source programming language, and wherein the at least one optimization comprises converting the source programming language of said generic application into a binary programming language, intermediate programming language, or another source programming language to reach a terminal that is initially not supported by said online distribution service; and
      transmitting said compiled application to said terminal,
      wherein said obtaining a characteristic of a terminal and said compiling said application as a function of said at least one characteristic are carried out when a filing of said generic application is made in parallel with a standard operation of said online distribution service.

5. A non-transitory computer-readable storage device comprising a computer program product stored thereon and executable by a data processor, wherein the computer program product comprises program code instructions for executing a method of making an application, dedicated to a type of terminal, available to an online distribution service, when this program is executed by the data processor, wherein the method comprises:
   identifying a type of terminal, associated with a terminal connected to said online distribution service, delivering an identifier of type of terminal;
   obtaining at least one characteristic of said terminal as a function of said type of terminal, said at least one characteristic including one or more of a version of supported APIs and a version of supported binary code or supported intermediary code;
   compiling said application from a generic application as a function of said at least one characteristic of said type of terminal, said compiling comprising:
      selecting, from a plurality of compilers, at least one compiler associated with said type of terminal;
      selecting, based on said at least one characteristic of said terminal, at least one optimization to be applied to said application, said at least one optimization comprising an intermediate code optimization to make said optimization compatible with supported APIs and compressed to limit a size of said application;
      compiling said application using said at least one selected compiler, said at least one selected optimization, and said generic application, wherein said generic application has a source programming language, and wherein the at least one optimization comprises converting the source programming language of said generic application into a binary programming language, intermediate programming language, or another source programming language to reach a terminal that is initially not supported by said online distribution service; and transmitting said compiled application to said terminal, wherein said obtaining a characteristic of a terminal and said compiling said application as a function of said at least one characteristic are carried out when a filing of said generic application is made in parallel with a standard operation of said online distribution service.

6. The method according to claim 1, wherein said standard operation of said online distribution service comprises a state of waiting for said compiling of said application and directly transmitting said application to a user if said application had previously been compiled.

7. The method according to claim 1, wherein said obtaining a characteristic of a terminal and said compiling said application as a function of said at least one characteristic are carried out once a new terminal is supported by said online distribution service or once a new dedicated compilation is selected for a given terminal in order to make said application available to a user before said user requests said application from said online distribution service.

8. The method according to claim 1, wherein said at least one optimization comprises a low level virtual machine bytecode optimizer, wherein said low level virtual machine bytecode optimizer compresses a size of said application.

9. The method according to claim 1, wherein said at least one optimization comprises prioritizing instructions that when executed by said compiler, consume low energy.

10. The method according to claim 1, wherein said generic application is comprised of a Dalvik Executable file.

11. The device for making an application of claim 4, wherein said at least one optimization comprises a low level virtual machine bytecode optimizer, wherein said low level virtual machine bytecode optimizer compresses a size of said application.

12. The device for making an application of claim 4, wherein said at least one optimization comprises prioritizing instructions that when executed by said compiler, consume low energy.

13. The device for making an application of claim 4, wherein said generic application is comprised of a Dalvik Executable file.

14. The non-transitory computer-readable storage device of claim 5, wherein said processor comprises multiple memory levels with caches, and wherein said at least one optimization comprises optimizing access to said caches to lower latency during memory access operations.

15. The non-transitory computer-readable storage device of claim 5, wherein said at least one optimization comprises prioritizing instructions that when executed by said compiler, consume low energy.

16. The non-transitory computer-readable storage device of claim 5, wherein said generic application is comprised of a Dalvik Executable file.

17. The non-transitory computer-readable storage device of claim 5, wherein said at least one optimization comprises a low level virtual machine bytecode optimizer, wherein said low level virtual machine bytecode optimizer compresses a size of said application.

* * * * *